United States Patent

Hans

Patent Number: 5,421,529
Date of Patent: Jun. 6, 1995

[54] PROCESS AND DEVICE FOR CLEANING SENSORS OF A YARN MONITORING SYSTEM

[75] Inventor: Pozzo Hans, Ingolstadt, Germany

[73] Assignee: Reiter Ingolstadt Spinnereimaschinenbau AG, Ingolstadt, Germany

[21] Appl. No.: 70,449
[22] PCT Filed: Dec. 10, 1992
[86] PCT No.: PCT/EP92/02851
 § 371 Date: Jun. 8, 1993
 § 102(e) Date: Jun. 8, 1993
[87] PCT Pub. No.: WO93/12028
 PCT Pub. Date: Jun. 24, 1993
[51] Int. Cl.⁶ .................. B65H 63/00; D01H 13/16
[52] U.S. Cl. .................................. 242/36; 57/81; 15/214; 15/256.6; 200/61.18
[58] Field of Search ............ 242/36; 200/61.13, 61.18; 57/81, 264; 15/97.1, 104.92, 209.1, 210.1, 214, 250.24, 256.6, DIG. 12

[56] References Cited

U.S. PATENT DOCUMENTS

| | | |
|---|---|---|
| 3,592,400 | 7/1971 | Gith ........................ 242/36 |
| 3,621,267 | 11/1971 | Dent ...................... 57/81 X |
| 3,772,524 | 11/1973 | Erbstein ................. 57/81 X |
| 3,844,101 | 10/1974 | Schwartz ................... 57/81 |
| 4,027,232 | 5/1977 | Domig et al. ......... 242/36 X |
| 4,214,717 | 7/1980 | Makino et al. .......... 242/36 |
| 4,256,247 | 3/1981 | Loepfe ............... 242/36 X |
| 4,814,633 | 3/1989 | Tholander ............ 57/81 X |
| 5,017,797 | 5/1991 | Uramoto et al. ..... 57/81 X |
| 5,074,480 | 12/1991 | Aeppli ..................... 242/36 |
| 5,267,701 | 12/1993 | Uchida et al. ....... 242/36 X |

FOREIGN PATENT DOCUMENTS

| | | |
|---|---|---|
| 1325212 | 3/1963 | France . |
| 4001255A1 | 7/1991 | Germany . |
| 535711 | 5/1973 | Switzerland . |
| 1539570 | 1/1979 | United Kingdom . |

Primary Examiner—Daniel P. Stodola
Assistant Examiner—Michael R. Mansen
Attorney, Agent, or Firm—Dority & Manning

[57] ABSTRACT

A process and device for the cleaning of the sensor surface of a yarn monitoring system used on spinning machines to monitor the yarn and/or the yarn quality. The yarn monitoring system is positioned without contact with the running yarn within the traversing area between draw-off roller and friction roller or below the draw-off roller. Cleaning of the sensor surfaces is carried out during the running of the yarn, at the reversal points of the yarn traversing movement, for the period of contact or nearness between the yarn and the limit of the yarn monitoring system until removal of the running yarn.

14 Claims, 3 Drawing Sheets

PROCESS AND DEVICE FOR CLEANING SENSORS OF A YARN MONITORING SYSTEM

BACKGROUND OF THE INVENTION

The invention relates to a process for the cleaning of the sensor surfaces of a yarn monitoring system used in spinning machines to monitor the yarn and/or yarn quality. The sensor surface is the surface which utilizes an optical or capacitive monitoring process in order to ensure signal acquisition according to the principle of the monitoring system. The present device serves to carry out the process.

The sensor surface of a yarn monitoring system is subject to dirt accumulation from the spinning process. The capacity of the sensor surface to function in its role as yarn monitor must be ensured.

Non-Contact monitoring and scanning of the yarn is carried out separately for each spinning station. A yarn monitoring system is an important evaluation unit for the spinning machine. Optical or capacitive yarn monitoring as part of the yarn monitoring system supplies information on the presence of the yarn and/or on the yarn thickness or yarn quality. For this, the sensor surfaces must be placed in immediate proximity of the yarn.

It is characteristic for these optical or capacitive monitoring systems that the yarn monitoring system is provided with a yarn monitor with a U-shaped measuring gap. The running yarn is guided inside this measuring gap without contacting the structure of the monitor. In principle, the optical or capacitive yarn monitoring system is designed so that two sensor surfaces face each other in one and the same horizontal plane in the form of laterally delimiting surfaces within the measuring gap.

Considerable amounts of dust, dirt particles, and reviving particles are produced during the spinning process and tend to deposit on the sensor surfaces and consequently these sensor surfaces of the yarn monitoring system can quickly reach a state of dirt accumulation such as to distort measured values.

Since this condition of dirt accumulation varies in the different yarn monitoring systems of the spinning stations and since therefore no sure prediction about a critical state of dirt accumulation can be made, periodic preventive cleaning of the sensor surfaces must be carried out according to the present state of the art.

Yarn monitoring systems in a high price range are sometimes equipped with an evaluating unit which is able to indicate the development of a critical operational state via a second signal output, but nevertheless it remains necessary to clean the sensor surfaces of the yarn monitoring system.

A known method for cleaning the sensors is to blow out the measuring gap or to provide aimed blowing on the sensor surfaces installed there in order to remove the dirt or to blow constantly on the running yarn before it enters the measuring space in such manner that the freely movable fibers carried along by the yarn are imparted a change of direction and cannot be deposited on the optics or on the capacitor plates. However, with these devices an additional blowing device and its precise positioning is required. In addition, sticky reviving particles can often not be removed from the sensor surface. Blowing alone does not provide a sufficient cleaning effect.

Another cleaning possibility is of a mechanical nature. An existing practice is also for the operating personnel to carry out the cleaning of the measuring gap manually with a brush when a functional malfunction is signalled in a yarn monitoring system, i.e. that they mechanically clean the optical or capacitive sensor surfaces. The affected spinning station is stopped for this cleaning operation.

DE-OS 40-01-255 describes how the measuring space is always scraped off mechanically by means of a rotating profile brush made of an elastic material when no yarn is present (e.g. after yarn breakage). This rotating brush can be combined with a blowing and suction device and is installed in an automatic service carriage travelling alongside the work stations. On the whole this solution is very cost-intensive and requires for the cleaning process that no yarn movement be present. Cleaning is therefore tied to an undesirable event which the industry is always trying to prevent. The aging of the elastic material or a tilting of the profile brush can cause scratching of the optically active surface.

OBJECTS AND SUMMARY OF THE INVENTION

It is a principal object of the instant invention to provide a method and apparatus to clean the sensor surfaces of the yarn monitoring system effectively, so that an impairment of the functioning of the measuring process by dirt is avoided. Additional objects and advantages will be set forth in part in the following description, or may become obvious therefrom, or may be learned by practice of the invention.

The invention is based on mobilizing the yarn itself into the cleaning process. A further characteristic is the fact that the yarn monitoring system must be installed in the path of a yarn with traversing movement. The size of the measuring gap therefore depends on the extent of the traversing movement. The yarn monitoring system can be installed above the draw-off roller in the path of the yarn between draw-off roller and friction roller, as well as below, between draw-off roller and yarn draw-off pipe. The latter with the provision that machines feature a small traversing movement in the mentioned segment to avoid the formation of grooves at the surface of the draw-off roller. For this purpose, the measuring gap which is U-shaped in a top-view of the yarn monitoring system is designed so that the applicable optical or capacitive lateral surface (sensor surface) is arranged parallel to the path of the yarn and placed at the reversal points of the traversing movement. In a front view of the measuring space a trapezoid surface with identical sides appears, with the theoretic symmetry axis being a momentary, central position of the yarn traversing movement. The smaller parallel side of the trapeze points in the direction of the incoming yarn.

The invention provides that the running yarn touch the optical or capacitive sensor surfaces of the yarn monitoring system. This contact by the running yarn causes mechanical scraping so that the deposits on the optical or capacitive sensor surface are effectively removed.

It was furthermore found that an effective cleaning process can be realized by means of the running yarn and without the above characteristic, even if the running yarn only comes near to the corresponding sensor surface to within a short distance. This distance must be permanently set. For this purpose, a stop projecting beyond the sensor surface is attached in a plane to each of the parallel sides of the trapezoid surface aspect of the measuring space (as seen in a front view). The stop thus extends into the traversing zone of the yarn. This applies to both sensor surfaces of the measuring gap. The yarn is thus restricted above and below the sensor surface so that it runs at a precisely defined distance from and parallel to the respective sensor surface. The stop is adjustable and can be set at a selected value so that the vertical distance between yarn and sensor surface has a constant value. The stop is made of a wear-proof material and has no edges where it touches the yarn. The traversing movement makes it possible for the running yarn to approach always one of the two sensor surfaces. As the yarn touches the stops of a sensor surface, the distance between yarn and sensor surface is reached precisely and only now makes the desired cleaning process possible. The cleaning process is achieved in that:

the existing hairiness of the yarn produces a "brush effect" in relation to the optically active surface;
a boundary layer forming around the running yarn produces an air flow which exerts an effective force on the deposited dust and fibers; and
the unsteadiness of the yarn movement ensures that a surface segment representing about 4 times the yarn width is cleaned.

The cleaning process continues until the yarn is again traversed in the opposite direction. It is possible to utilize these three effects at the same time only by fixing the yarn precisely in relation to the sensor surface at the reversal point of the traversing movement.

The hairiness of the yarn ensures that the individual fibers will spread away from the yarn, making it possible to achieve a "brush effect" when they make contact with the sensor surface, due to the short distance between yarn and sensor surface. The greater the hairiness of the yarn, the better the "brush effect". The boundary layer air flow forming around the running yarn can be used effectively due to the fixed distance in order to remove the deposited dust and individual fibers by way of the air stream. The existing unsteadiness in the movement of the yarn, together with the two above-described effects, produce a cleaning lane equal to approximately 4 times the yarn thickness on the sensor surface. This enables the sensor surface to monitor the yarn at all times while dust and the deposit of fibers are removed effectively.

It is a decisive advantage of the invention that cleaning can be carried out during operation of the spinning stations and can be carried out with surprisingly few technical changes or modifications.

In continuous operation of the spinning machine, the frequency of the cleaning process limited in time is sufficient to avoid that the measuring process be influenced by dirt accumulation.

The process and the device for the cleaning of the sensor surfaces of the yarn monitoring system are explained in further detail through embodiments illustrated in the drawings.

DETAILED DESCRIPTION OF THE PREFERRED EMBODIMENTS

Figure 1:
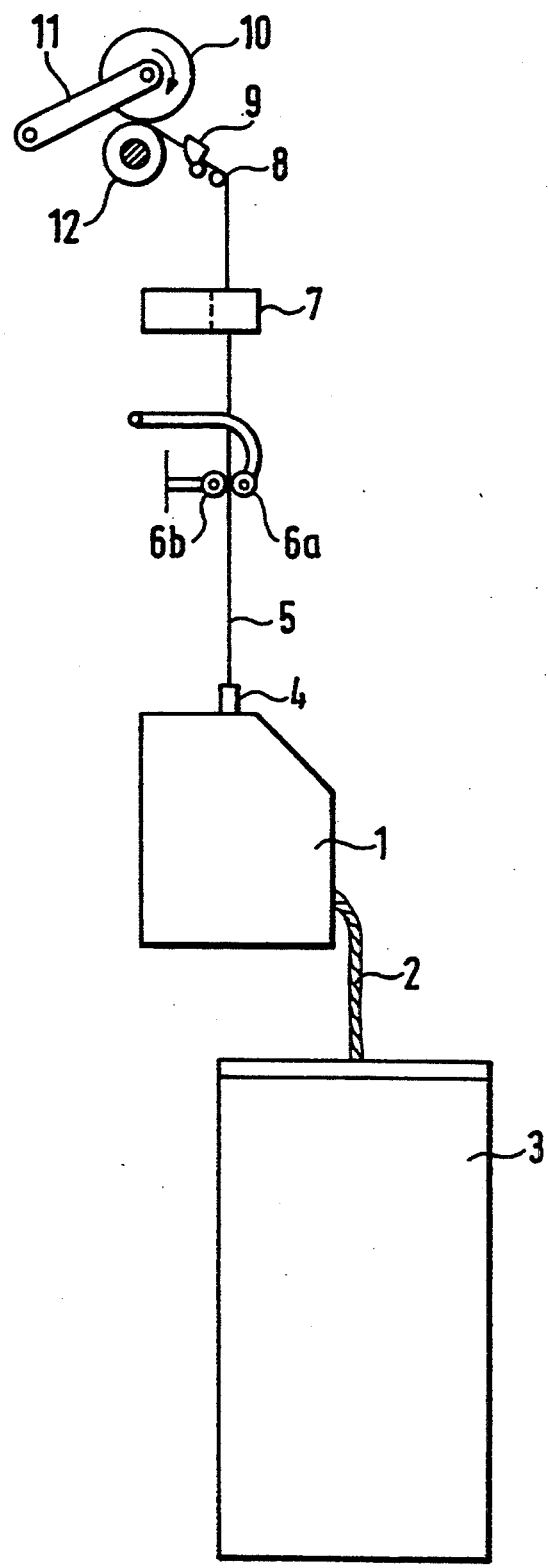
FIG. 1 shows the path of a yarn in an open-end spinning machine with the positioning of the yarn monitoring system.

Reference will now be made in detail to the presently preferred embodiments of the invention, one or more examples of which are illustrated in the accompanying drawings. Each example is provided by way of explanation of the invention, not limitation of the invention. The numbering of components in the drawings is consistent throughout the application, with the same components having the same number in each of the drawings.

The figures are not drawn to scale. According to FIG. 1, the spin box 1 in an open-end spinning machine is supplied with a fiber sliver 2 coming from a presentation can 3. According to FIG. 1, the yarn is drawn off via yarn draw-off pipe 4 by means of the draw-off rollers 6a and 6b. From here the yarn is conveyed on over yarn deflection rod 8 and is wound up over the width of a yarn bobbin 10 as a result of the traversing movement of the yarn guide 9, whereby the yarn bobbin is held by bobbin holders 11. The yarn bobbin 10 is driven via friction roller 12.

To monitor the yarn run R (FIG. 2), optical or capacitive yarn monitoring systems are used in the textile industry. The yarn monitoring system is provided with a measuring gap which is U-shaped and surrounds the yarn without touching it, so that the yarn runs between the two sensor surfaces facing each other.

FIG. 1 shows the installation of a yarn monitoring system 7 in the path of the yarn above the draw-off rollers 6a, 6b. This installation could also be made below the draw-off rollers in the path of the yarn between draw-off rollers 6a, 6b and the draw-off pipe 4. The important factor is the presence of a traversing movement of the yarn 5. The measuring gap of the yarn monitoring system must therefore be designed so that it does not interfere in its positioning with yarn traversing.

Figure 2:
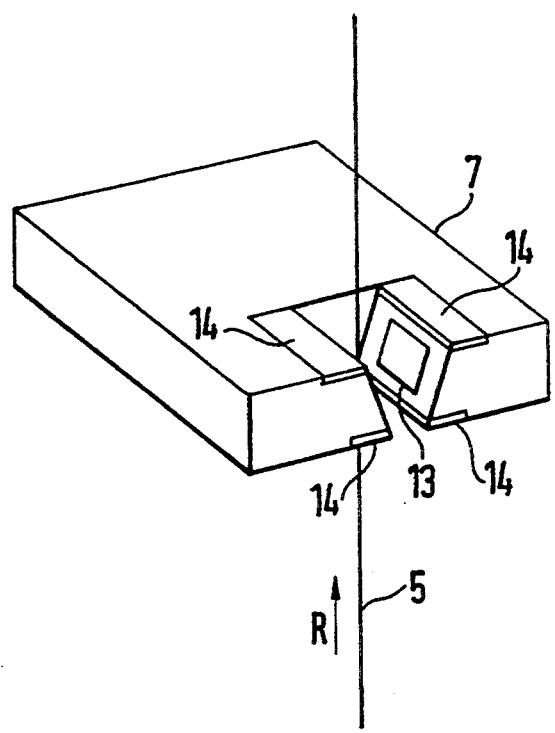
FIG. 2 shows a yarn monitoring system with a U-shaped gap in the path of the yarn.

In FIG. 2, one of the sensor surfaces 13 can be seen while the facing surface is not visible in the figure. The measuring gap surrounds the yarn in form of a "U". The sensor surfaces (13, 13') are inclined with respect to the path of the yarn and are the limits, i.e. the reversal points of the traversing movement.

Figure 3:
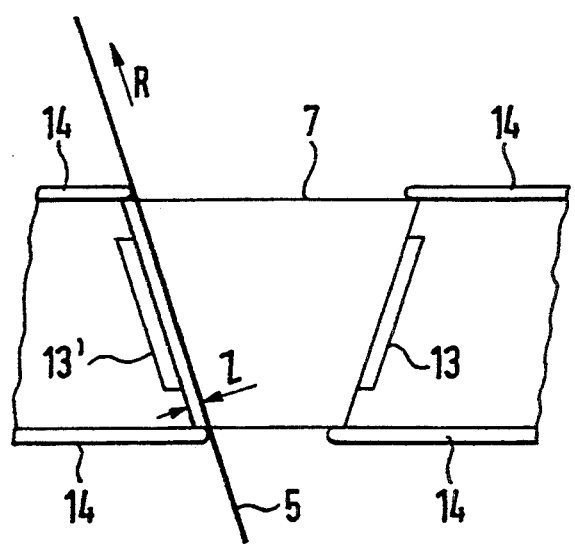
FIG. 3 shows a section from the front view of the yarn monitoring system with a trapezoidal gap surface.
Figure 4:
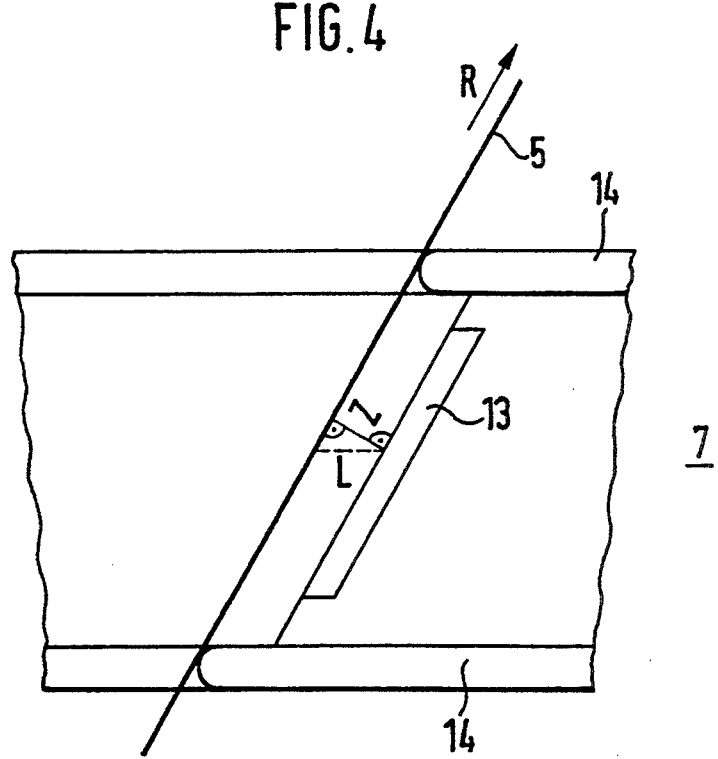
FIG. 4 shows the relative parallel position between yarn and sensor surface during the approach.

The details of the invention are more particularly shown in FIG. 3. It shows that the measuring gap as seen from the front constitutes a trapezoidal surface with identical sides. The identical-side surfaces support the sensor surfaces 13, 13' which face each other. These sensor surfaces are permeable to light if an optical monitoring system is used and consist as a rule of a plastic material or glass. When a capacitive monitoring system is used, the capacitor plates are made of a special steel. It can be seen that these sensor surfaces face each other in a horizontal plane. These sensor surfaces are at a distance determined by the housing of the yarn monitoring system 7 from the different covering plates 14. A covering plate 14 extending beyond sensor surface 13, 13' so that (as shown in FIG. 3) the yarn 5 subject to the traversing movement is forced to take its course at a precise, vertical distance Z from and parallel to the sensor surface is provided above and below for each sensor surface 13, 13'. This distance is a value selected between 0.3 and 0.5 mm which is optimal at 0.4 mm to carry out the process. A preferred vertical distance Z of 0.4 mm is drawn in FIG. 4. This vertical distance Z measuring 0.4 mm determines the parallel position of yarn 5 and sensor surfaces 13, 13'. From what is shown it can be seen that the cover plate 14 must therefore extend beyond the sensor surface by a length which must be equal to the length of the hypothenuse L of the triangle (not drawn to scale in FIG. 4). These cover plates 14 are made of a wear-proof material such as ceramic or special steel and have no edges where they are in contact with the running yarn.

As the yarn moves in its traversing movement it of course touches each time one pair of cover plates 14. The cleaning process lasts always for the time of contact between the yarn and the cover plates arranged in pair until the yarn is returned from the cover plates by the traversing yarn guide 9.

The constant distance Z prevents the running yarn from pressing against the sensor surface. Due to the hairiness of the yarn the spread-out fibers brush over the optically active surface and clean it of dust and deposited free fibers in addition to this "brush effect" another effect is also used. The boundary layer flow produced around the running yarn causes a draft which also reaches the optically active surface and cleans it.

Figure 5:
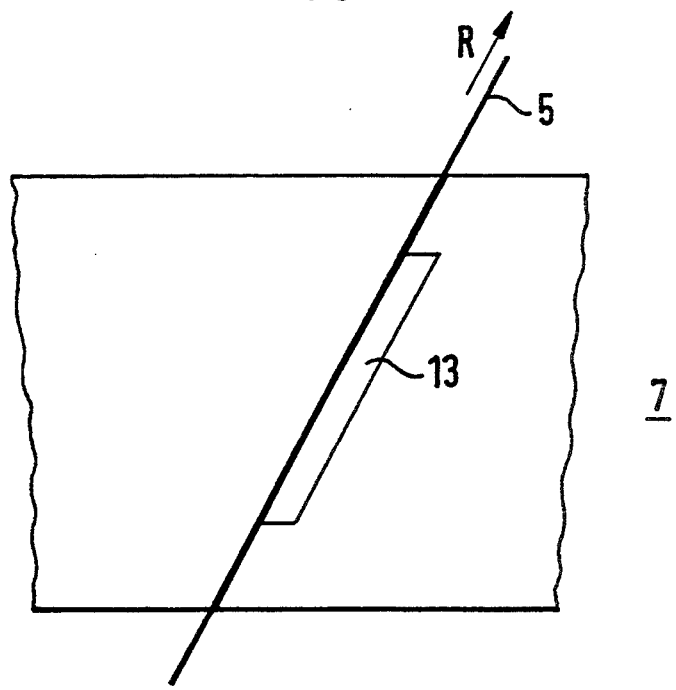
FIG. 5 shows contact between yarn and sensor surface.

FIG. 5 shows the cleaning of the sensor surface through contact with the running yarn. The yarn is moved on the sensor surface in the direction of yarn draw-off. At the same time the yarn scrapes the sensor surface and thus removes dirt and dust deposits. This contact becomes possible because the sensor surface is at the same time a stop and a reversal point for the traversing yarn. Cleaning starts with the contact between yarn 5 and sensor surface 13 and ends with the return movement of the yarn in the direction of the facing sensor surface 13'.

It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents.

I claim:

1. A yarn monitoring device for measuring yarn presence or yarn quality in a spinning machine, said device comprising:

a yarn sensor, said yarn sensor disposable at a point along a running length of yarn in the spinning machine where the yarn has a traversing back and forth motion between opposite reversal points;

said yarn sensor including oppositely disposed sensor surfaces adjacent said reversal points defining a measuring gap therebetween through which the yarn runs, said measuring gap having an axis corresponding generally to the centerline axis of the traversing path of the yarn; and said sensor surfaces positioned so that the traversing yarn running therebetween is parallel to said sensor surfaces at said reversal points, said sensor surfaces set back from said reversal points a predetermined uniform distance along the length of said sensor surfaces so that only fiber hairs extending generally radially outward from the running yarn contacts said sensor surfaces at said reversal points, said sensor surfaces thereby being cleaned through contact with the radially extending yarn hairs and by an airstream generated by the traversing movement of the yarn.

2. The device as in claim 1, wherein said yarn sensor comprises a generally U-shaped element with slanted inner faces, said U-shaped element defining a generally trapezoidal cross-sectional profile, said sensor surfaces being disposed on said inner faces.

3. The device as in claim 1, wherein said sensor surfaces are set back from said reversal points generally 0.4 millimeters.

4. The device as in claim 1, wherein said sensor includes stops, said stops extending past said sensor surfaces into said measuring gap and positioned so that the yarn contacts said stops at said reversal points within said measuring gap so that the running yarn is prevented from sliding against said sensor surfaces and only fiber hairs extending radially from said yarn contact said sensor surfaces.

5. The device as in claim 4, wherein said stops are positioned so that said predetermined uniform distance from said sensor surfaces to said reversal points is within a range of generally 0.3 to 0.5 millimeters.

6. The device as in claim 5, wherein said stops are adjustable within said range.

7. A process for cleaning sensor surfaces of a yarn monitoring system, the sensor surfaces disposed in a yarn sensor which forms a measuring gap through which the yarn runs in a back and forth traversing path between opposite reversal points, said process comprising the steps of positioning the sensor surfaces within the measuring gap set back from the respective reversal points a predetermined uniform distance and parallel to the running course of the yarn at the respective reversal points so that the only radially extending fiber hairs from the yarn contacts the sensor surfaces only at its reversal points within the measuring gap, and cleaning the sensor surfaces through contact with the radially extending yarn hairs and through an airstream generated by the traversing motion of the yarn in a space between the yarn and sensor surfaces.

8. The process as in claim 7, including positioning the sensor surfaces set back from the reversal points generally within a range of 0.3 to 0.5 millimeters.

9. A spinning machine having a yarn monitoring system for detecting the presence or quality of running yarn being spun thereby, the yarn having a traversing motion along a running length through said monitoring system, comprising:

a yarn sensor, said yarn sensor disposable at a point along a running length of yarn in the spinning machine where the yarn has a traversing back and forth motion between opposite reversal points;

said yarn sensor including oppositely disposed sensor surfaces adjacent said reversal points defining a measuring gap therebetween through which the yarn runs, said measuring gap having an axis corresponding generally to the centerline axis of the traversing path of the yarn; and said sensor surfaces positioned so that the traversing yarn running therebetween is parallel to said sensor surfaces at said reversal points., said sensor surfaces set back from said reversal points a predetermined uniform distance along the length of said sensor surfaces so that only fiber hairs extending generally radially outward from the running yarn contacts said sensor surfaces at said reversal points, said sensor surfaces thereby being cleaned through contact with the radially extending yarn hairs and by an airstream generated by the traversing movement of the yarn.

10. The spinning machine as in claim 9, wherein said yarn sensor comprises a generally U-shaped element with slanted inner faces, said U-shaped element defining a generally trapezoidal cross-sectional profile, said sensor surfaces being disposed on said inner faces.

11. The device as in claim 9, wherein said sensor surfaces are disposed so that a predetermined uniform optimum distance is defined between the yarn and sensor surfaces at the reversal points of the yarn generally along the entire length of said sensor surfaces.

12. The device as in claim 11, wherein said sensor includes stops, said stops extending past said sensor surfaces into said measuring gap and positioned so that the yarn contacts said stops at said reversal points within said measuring gap so that the running yarn is prevented from sliding against said sensor surfaces and only fiber hairs extending radially from said yarn contact said sensor surfaces.

13. The device as in claim 12, wherein said stops are positioned so that said predetermined uniform distance from said sensor surfaces to said reversal points is within a range of generally 0.3 to 0.5 millimeters.

14. The device as in claim 13, wherein said stops are adjustable within said range.

* * * * *